United States Patent
Kashiwagi et al.

(10) Patent No.: US 12,441,619 B2
(45) Date of Patent: Oct. 14, 2025

(54) SURFACE-MODIFIED NANODIAMONDS AND METHOD FOR PRODUCING SURFACE-MODIFIED NANO CARBON PARTICLES

(71) Applicant: DAICEL CORPORATION, Osaka (JP)

(72) Inventors: Takeru Kashiwagi, Tokyo (JP); Hiroshi Koyama, Tokyo (JP); Atsushi Kume, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 0 days.

(21) Appl. No.: 18/503,620

(22) Filed: Nov. 7, 2023

(65) Prior Publication Data
US 2024/0116762 A1   Apr. 11, 2024

Related U.S. Application Data (62) Division of application No. 17/618,186, filed as application No. PCT/JP2020/021927 on Jun. 3, 2020.

(30) Foreign Application Priority Data

Jun. 11, 2019   (JP) .................. 2019-108926

(51) Int. Cl.
    *C01B 32/28*   (2017.01)
    *C09C 1/44*    (2006.01)
    *C09C 3/08*    (2006.01)

(52) U.S. Cl.
    CPC ............... *C01B 32/28* (2017.08); *C09C 1/44* (2013.01); *C09C 3/08* (2013.01); *C01P 2002/82* (2013.01);
    (Continued)

(58) Field of Classification Search
    None
    See application file for complete search history.

(56) References Cited

U.S. PATENT DOCUMENTS

| | | |
|---|---|---|
| 2012/0271361 A1 | 10/2012 | Zhou et al. |
| 2017/0240429 A1 | 8/2017 | Yamakawa |
| 2020/0123012 A1 | 4/2020 | Makino et al. |

FOREIGN PATENT DOCUMENTS

| | | |
|---|---|---|
| CN | 107074554 A | 8/2017 |
| CN | 109071235 A | 12/2018 |

(Continued)

OTHER PUBLICATIONS

English translation of Kondo et al. (JP 2017-214244). (Year: 2017).*

(Continued)

*Primary Examiner* — Ronak C Patel
(74) *Attorney, Agent, or Firm* — Birch, Stewart, Kolasch & Birch, LLP (57) ABSTRACT

Provided is a surface-modified nanodiamond having excellent dispersibility in an organic solvent, and a method capable of introducing various surface-modifying groups and easily producing surface-modified nanocarbon particles with little zirconia contamination. The surface-modified nanodiamond includes nanodiamond particles and a group that surface-modifies the nanodiamond particles and is represented by Formula (1): —X—R$^1$ (1) [where X represents —NH—, —O—, —O—C(=O)—, —C(=O)—O—, —NH—C(=O)—, —C(=O)—NH—, or —S—; the bond extending left from X is bonded to a nanodiamond particle; R$^1$ represents a monovalent organic group that does not have a hydroxy group, carboxy group, amino group, monosubstituted amino group, terminal alkenyl group, and terminal epoxy group; an atom bound to X is a carbon atom; and a molar ratio of carbon atoms to the total amount of (Continued)

heteroatoms selected from the group consisting of nitrogen atoms, oxygen atoms, sulfur atoms, and silicon atoms is 4.5 or greater.

13 Claims, 3 Drawing Sheets

(52) U.S. Cl.
 CPC ...... *C01P 2004/62* (2013.01); *C01P 2004/64* (2013.01)

(56) References Cited

FOREIGN PATENT DOCUMENTS

| | | | |
|---|---|---|---|
| JP | 2008-303104 | A | 12/2008 |
| JP | 2016-172823 | A | 9/2016 |
| JP | 2017-214244 | A | 12/2017 |
| JP | 2018-140893 | A | 9/2018 |
| TW | 201806857 | A | 3/2018 |

OTHER PUBLICATIONS

Chinese Office Action and Search Report for Chinese Application No. 202080042784.8, dated Dec. 14, 2023.
Taiwanese Office Action and Search Report for Taiwanese Application No. 109119160, dated Jan. 29, 2024.
International Preliminary Report on Patentability and English translation of the Written Opinion of the International Searching Authority for International Application No. PCT/JP2020/021927, dated Dec. 14, 2021.
International Search Report for International Application No. PCT/JP2020/021927, dated Aug. 18, 2020, with English translation.
Krueger et al., "Deagglomeration and functionalisation of detonation nanodiamond with long alkyl chains," Diamond & Related Materials, vol. 17, 2008 (Available online Jan. 24, 2008), pp. 1367-1370.
Krueger et al., "Functionality is Key: Recent Progress in the Surface Modification of Nanodiamond," Advanced Functional Materials, vol. 22, 2012, pp. 890-906.
Liu et al., "Functionalization of Nanoscale Diamond Powder: Fluoro-, Alkyl-, Amino-, and Amino Acid-Nanodiamond Derivatives," Chemistry of Materials, vol. 16, 2004, pp. 3924-3930.
Wang et al., "Functionalization of nanodiamond particles with N,O-carboxymethyl chitosan," Diamond & Related Materials, vol. 19, 2010 (Available online Feb. 4, 2010), pp. 441-444.
Zheng et al., "Organic functionalization of ultradispersed nanodiamond: synthesis and applications." Journal of Materials Chemistry, vol. 19, 2009 (Available online Oct. 2, 2009), pp. 8432-8441.
Chinese Office Action and Search Report for Chinese Application No. 202080042784.8, dated Aug. 24, 2024.
Mallakpour et al., "Efficient surface modification of MWCNTs with vitamin B1 and production of poly(ester-imide)/MWCNTs nanocomposites containing L-phenylalanine moiety: Thermal and microscopic study," eXPRESS Polymer Letters, vol. 10, No. 1, 2016, pp. 54-64.
Taiwanese Office Action and Search Report for Taiwanese Application No. 109119160, dated Apr. 18, 2025.

\* cited by examiner

SURFACE-MODIFIED NANODIAMONDS AND METHOD FOR PRODUCING SURFACE-MODIFIED NANO CARBON PARTICLES

CROSS-REFERENCE TO RELATED APPLICATIONS

This application is a Divisional of copending application Ser. No. 17/618,186, filed on Dec. 10, 2021, which is the National Phase under 35 U.S.C. § 371 of International Application No. PCT/JP2020/021927, filed on Jun. 3, 2020, and which claims priority under 35 U.S.C. § 119(a) to Application No. 2019-108926, filed in Japan on Jun. 11, 2019, all of which are hereby expressly incorporated by reference into the present application.

TECHNICAL FIELD

The present invention relates to a surface-modified nanodiamond and a method for producing surface-modified nanocarbon particles. The present patent application claims priority from the Japanese Patent Application No. 2019-108926, filed in Japan on Jun. 11, 2019, the contents of which are incorporated herein by reference.

BACKGROUND ART

Nano-sized fine substances such as nanocarbon particles are known to have novel characteristics that cannot be achieved in a bulk state. For example, nanodiamond particles (i.e., nano-sized diamond particles) exhibit mechanical strength, a high refractive index, thermal conductivity, insulating properties, antioxidation properties, and an action of promoting the crystallization of resins, and the like. However, nanodiamond particles typically have large proportions of surface atoms, a sum of van der Waals forces that can act between surface atoms of adjacent particles becomes strong, which tends to cause aggregation. In addition, in the case of nanodiamond particles, Coulomb interaction between crystalline surfaces of adjacent crystals may contribute to agglutination, which is a phenomenon where particles form a significantly firm cluster. Thus, it was extremely difficult to disperse nanodiamond particles to be in a state of primary particles in an organic solvent or within a resin. Therefore, the surface of nanodiamond particles is modified to impart dispersibility to the nanodiamond particles to suppress aggregation.

As the nanodiamond having a modified surface, for example, a surface-modified nanodiamond in which a monovalent organic group having a hydroxy group at a terminal is introduced into nanodiamond particles via an ether bond is known (see Non-Patent Literature 1). In addition, a surface-modified nanodiamond in which a monovalent organic group having an amino group at a terminal is introduced into nanodiamond particles via an amino bond is known (see Non-Patent Literature 2).

Further, as a method for obtaining a surface-modified nanodiamond in which a monovalent organic group is introduced onto the surface of the nanodiamond, for example, a method in which powder of nanodiamond particles is reacted with a reactant (see Non-Patent Literatures 1 and 2), and a method in which aggregates of nanodiamond particles are reacted with a reactant while being disintegrated by performing bead mill treatment using zirconia beads or the like in an organic solvent are known (see Patent Document 1).

CITATION LIST

Patent Documents

Patent Document 1: JP 2017-214244 A

Non-Patent Literature

Non-Patent Literature 1: Journal of Materials Chemistry 19 (2009) 8432-8441
Non-Patent Literature 2: Chemistry of Materials 16 (2004) 3924-3930

SUMMARY OF INVENTION

Technical Problem

However, the nanodiamond described in Non-Patent Literature 1 in which a monovalent organic group having a hydroxy group at the terminal is surface-modified and the nanodiamond described in Non-Patent Literature 2 in which a monovalent organic group having an amino group at the terminal is surface-modified are inferior in dispersibility in an organic solvent.

Therefore, a first object of the present invention is to provide a surface-modified nanodiamond having excellent dispersibility in an organic solvent.

The method of obtaining surface-modified nanocarbon particles such as surface-modified nanodiamond by reacting powder of nanodiamond particles with a reactant is problematic in that it takes time and effort, as such a method requires, from the viewpoint of the solubility of the reactant in a solvent, disintegration by bead mill treatment or the like to obtain an aqueous dispersion, and then drying or desolventizing to obtain powder of nanodiamond particles, and dispersing the powder in a solvent excellent in solubility of the reactant. In addition, when disintegration and reaction are simultaneously performed by bead mill treatment as disclosed in Patent Document 1, it is difficult to perform a specific reaction such as heating or dehydration condensation, and therefore, there are problems such as limitation of a surface-modifying group that can be introduced, contamination of zirconia derived from zirconia beads used in a bead mill, and the like.

Accordingly, a second object of the present invention is to provide a method capable of introducing various surface-modifying groups and easily producing surface-modified nanocarbon particles with little zirconia contamination.

Solution to Problem

As a result of intensive studies to achieve the first object, the inventors of the present invention have found that a specific surface-modified nanodiamond has excellent dispersibility in an organic solvent. In addition, as a result of intensive studies to achieve the second object, the inventors of the present invention have found that various surface-modifying groups can be introduced by reacting nanocarbon particles having a hydroxy group or a carboxy group on the surface, the nanocarbon particles in a state of being nanodispersed in water, with a specific reactant in the presence of an acid catalyst, and surface-modified nanocarbon particles can be easily produced with little zirconia contamination. The present invention relates to what has been completed based on these findings.

The present invention provides a surface-modified nanodiamond including a nanodiamond particle and a group that surface-modifies the nanodiamond particle, the group being represented by Formula (1):

—X—R$^1$         (1)

where, in Formula (1), X represents —NH—, —O—, —O—C(=O)—, —C(=O)—O—, —NH—C(=O)—, —C(=O)—NH—, or —S—, and a bond extending left from X is bonded to a nanodiamond particle; R$^1$ represents a monovalent organic group having no hydroxy group, carboxy group, amino group, mono-substituted amino group, terminal alkenyl group, or terminal epoxy group, and an atom bonded to X is a carbon atom; and In Formula (1), a molar ratio of a carbon atom content to a total content of heteroatoms, which are selected from the group consisting of nitrogen atoms, oxygen atoms, sulfur atoms, and silicon atoms is 4.5 or greater.

In Formula (1), X may be —O—, —O—C(=O)—, or —C(=O)—O—, and R$^1$ may be a monovalent substituted or unsubstituted hydrocarbon group having no hydroxy group, carboxy group, amino group, mono-substituted amino group, terminal alkenyl group, or terminal epoxy group.

In Formula (1), X may be —O—, —O—C(=O)—, or —C(=O)—O—, and R$^1$ may be a linear or branched hydrocarbon group containing 8 to 20 carbons and having no terminal alkenyl group.

In Formula (1), X may be —NH—.

In Formula (1), X may be —NH—, and R$^1$ may be a monovalent organic group containing 8 to 20 carbon atoms and having no hydroxy group, carboxy group, amino group, mono-substituted amino group, terminal alkenyl group, or terminal epoxy group.

In Formula (1), X may be —NH—, and R$^1$ may be a monovalent organic group containing a hydrocarbon group having 4 or more carbon atoms continuously in a straight chain, the monovalent organic group having no hydroxy group, carboxy group, amino group, mono-substituted amino group, terminal alkenyl group, or terminal epoxy group.

Further, the present invention provides a surface-modified nanodiamond including a nanodiamond particle and a group that surface-modifies the nanodiamond particles, the group being represented by Formula (I):

[Chem. 1]

(I)

where in Formula (I), X$^1$ represents —NH—, —O—, —O—C(=O)—, —C(=O)—O—, —NH—C(=O)—, —C(=O)—NH—, or —S—, and a bond extending left from X$^1$ is bonded to a nanodiamond particle; R$^A$ represents a divalent organic group, and an atom bonded to X$^1$ is a carbon atom; and R$^B$ represents a monovalent organic group.

In Formula (I), R$^A$ is preferably a divalent linear or branched hydrocarbon group having 6 to 12 carbons.

In Formula (I), R$^B$ is preferably a monovalent linear or branched hydrocarbon group having from 6 to 12 carbons.

In Formula (I), X$^1$ preferably represents —NH— or —O—.

The present invention provides a method of producing surface-modified nanocarbon particles, the method including subjecting a nanocarbon particle that has on its surface a hydroxy group or a carboxy group and is in nanodispersed state in water, to a reaction with a compound represented by Formula (2) in the presence of an acid catalyst to obtain surface-modified nanocarbon particles:

R$^2$—Y—H         (2)

where in Formula (2), Y represents —NH—, —O—, —C(=O)—O—, —C(=O)—NH—, or —S—; and R$^2$ represents a monovalent organic group, and an atom bonded to Y is a carbon atom.

The nanocarbon particle in nanodispersed state in water preferably has a median diameter from 1 to 100 nm.

The acid catalyst is preferably a sulfonic acid group-containing compound and/or an ammonium salt of a sulfonic acid group-containing compound.

The nanocarbon particle is a nanodiamond particle.

Advantageous Effects of Invention

The surface-modified nanodiamond of the present invention has excellent dispersibility in an organic solvent. The surface-modified nanodiamond according to an embodiment of the present invention has an epoxy group inside a surface-modifying group, and therefore has excellent chemical stability when the surface-modified nanodiamond has an epoxy group at the terminal. Further, the method of producing surface-modified nanocarbon particles according to the present invention can introduce various surface-modifying groups and can easily produce surface-modified nanocarbon particles with little zirconia contamination.

DESCRIPTION OF EMBODIMENTS

Surface-Modified Nanodiamond

A surface-modified nanodiamond according to an embodiment of the present invention (hereinafter, a nanodiamond may be referred to as "ND") includes nanodiamond particles and a group that surface-modifies the nanodiamond particles, the group being represented by Formula (1). It is noted that, in the present specification, the group represented by Formula (1) may be referred to as "surface-modifying group (X1)". The surface-modified ND may have only one type of surface-modifying groups (X1), or may have two or more types thereof.

—X—R$^1$         (1)

where in Formula (1), X represents —NH—, —O—, —O—C(=O)—, —C(=O)—O—, —NH—C(=O)—, —C(=O)—NH—, or —S—, and the bond extending left from X is bonded to a nanodiamond particle; R$^1$ represents a monovalent organic group having no hydroxy group, carboxy group, amino group, mono-substituted amino group, terminal alkenyl group, or terminal epoxy group, and an atom bonded to X is a carbon atom; and In Formula (1), a molar ratio of a carbon atom content to a total content of heteroatoms, which are selected from the group consisting of nitrogen atoms, oxygen atoms, sulfur atoms, and silicon atoms is 4.5 or greater.

In Formula (1), X represents —NH—, —O—, —O—C(=O)—, —C(=O)—O—, —NH—C(=O)—, —C(=O)—NH—, or —S—, and the bond extending left from X is bonded to a nanodiamond particle. It is noted that in each of these listed bonds, the bond extending to the left is bonded to a nanodiamond particle and the bond extending to the right is bonded to $R^1$.

In Formula (1), le represents a monovalent organic group having no hydroxy group, carboxy group, amino group, mono-substituted amino group, terminal alkenyl group, or terminal epoxy group, and an atom bonded to X is a carbon atom. That is, $R^1$ is a monovalent organic group and is free of a hydroxy group, a carboxy group, an amino group, a mono-substituted amino group, a terminal alkenyl group, and a terminal epoxy group. It is noted that, in the present specification, the "terminal" in the terminal alkenyl group and the terminal epoxy group includes both a terminal of a main chain and a terminal of a branched chain. Specifically, the term "terminal alkenyl group" refers to "—CH=CH", and the term "terminal epoxy group" refers to an epoxy group having no organic group on two carbon atoms constituting an oxirane ring. Furthermore, the monovalent organic group as $R^1$ is preferably free of functional groups containing active hydrogen (such as a hydroxy group, a carboxy group, an amino group, a mono-substituted amino group, a thiol group, and a phosphate group). It is noted that, in the present specification, the amino group simply referred to as "amino group" refers to "—NH$_2$", and the term "mono-substituted amino group" refers to "—NHR" (R represents a monovalent organic group).

Examples of the monovalent organic group of $R^1$ include a substituted or unsubstituted hydrocarbon group (a monovalent hydrocarbon group), a substituted or unsubstituted heterocyclic group (a monovalent heterocyclic group), and a group in which two or more of the aforementioned monovalent hydrocarbon group and/or the aforementioned monovalent heterocyclic group are bonded. The bonded group may be directly bonded or may be bonded via a linking group. Examples of the linking group include an amino group, an ether bond, an ester bond, a phosphinic acid group, a sulfide bond, a carbonyl group, an organic group-substituted amide group, an organic group-substituted urethane bond, an organic group-substituted imide bond, a thiocarbonyl group, a siloxane bond, and a group in which two or more of those listed above are bonded.

Examples of the hydrocarbon group of the monovalent organic group include, for example, an aliphatic hydrocarbon group, an alicyclic hydrocarbon group, an aromatic hydrocarbon group, and a group in which two or more of those listed above are bonded.

Examples of the aliphatic hydrocarbon group include an alkyl group, an alkenyl group, and an alkynyl group. Examples of the alkyl group include a $C_{1-22}$ alkyl group, such as a methyl group, an ethyl group, a propyl group, an isopropyl group, a butyl group, a hexyl group, an octyl group, an isooctyl group, a decyl group, and a dodecyl group (preferably a $C_{2-20}$ alkyl group, and more preferably a $C_{3-18}$ alkyl group). Examples of the alkenyl group include a $C_{2-22}$ alkenyl group, such as a vinyl group, an allyl group, a methallyl group, a 1-propenyl group, an isopropenyl group, a 1-butenyl group, a 2-butenyl group, a 3-butenyl group, a 1-pentenyl group, a 2-pentenyl group, a 3-pentenyl group, a 4-pentenyl group, and a 5-hexenyl group (preferably a $C_{4-20}$ alkenyl group, and more preferably a $C_{8-18}$ alkenyl group). Examples of the alkynyl group include a $C_{2-22}$ alkynyl group, such as an ethynyl group and a propynyl group (preferably a $C_{4-20}$ alkynyl group, and more preferably a $C_{8-18}$ alkynyl group).

Examples of the alicyclic hydrocarbon group include: a $C_{3-12}$ cycloalkyl group, such as a cyclopropyl group, a cyclobutyl group, a cyclopentyl group, a cyclohexyl group, and a cyclododecyl group; a $C_{3-12}$ cycloalkenyl group, such as a cyclohexenyl group; and a $C_{4-15}$ crosslinked cyclic hydrocarbon group, such as a bicycloheptanyl group and a bicycloheptenyl group.

Examples of the aromatic hydrocarbon group include a $C_{6-14}$ aryl group, such as a phenyl group and a naphthyl group (especially, a $C_{6-10}$ aryl group).

Examples of the heterocycle forming the above heterocyclic group include an aromatic heterocycle and a non-aromatic heterocycle. Examples of such a heterocycle include a 3 to 10-membered ring (preferably a 4 to 6-membered ring) having a carbon atom and at least one heteroatom (for example, oxygen atom, sulfur atom, and nitrogen atom) as atoms constituting the ring, and a condensed ring thereof. Specific examples thereof include a heterocycle containing an oxygen atom as a heteroatom (for example, a 3-membered ring, such as an oxirane ring; a 4-membered ring, such as an oxetane ring; a 5-membered ring, such as a furan ring, a tetrahydrofuran ring, an oxazole ring, an isoxazole ring, and a γ-butyrolactone ring; a 6-membered ring, such as a 4-oxo-4H-pyran ring, a tetrahydropyran ring, and a morpholine ring; a condensed ring, such as a benzofuran ring, an isobenzofuran ring, a 4-oxo-4H-chromene ring, a chroman ring, and an isochroman ring; and a crosslinked ring, such as a 3-oxatricyclo[4.3.1.1$^{4,8}$]undecan-2-one ring and a 3-oxatricyclo[4.2.1.0$^{4,8}$]nonan-2-one ring), a heterocycle containing a sulfur atom as a heteroatom (for example, a 5-membered ring, such as a thiophene ring, a thiazole ring, an isothiazole ring, and a thiadiazole ring; a 6-membered ring, such as a 4-oxo-4H-thiopyran ring; and a condensed ring, such as a benzothiophene ring), and a heterocycle containing a nitrogen atom as a heteroatom (for example, a 5-membered ring, such as a pyrrole ring, a pyrrolidine ring, a pyrazole ring, an imidazole ring, and a triazole ring; a 6-membered ring, such as an isocyanuric ring, a pyridine ring, a pyridazine ring, a pyrimidine ring, a pyrazine ring, a piperidine ring, and a piperazine ring; and a condensed ring, such as an indole ring, an indoline ring, a quinoline ring, an acridine ring, a naphthyridine ring, a quinazoline ring, and a purine ring).

Furthermore, examples of the group in which an aliphatic hydrocarbon group and an alicyclic hydrocarbon group are bonded include a cyclohexylmethyl group and a methylcyclohexyl group. Examples of the group in which an aliphatic hydrocarbon group and an aromatic hydrocarbon group are bonded include a $C_{7-18}$ aralkyl group (especially, a $C_{7-10}$ aralkyl group), such as a benzyl group and a phenethyl group; a $C_{6-10}$ aryl-$C_{2-6}$ alkenyl group, such as a cinnamyl group; a $C_{1-4}$ alkyl-substituted aryl group, such as a tolyl group; and a $C_{2-4}$ alkenyl-substituted aryl group, such as a styryl group.

Examples of the group in which two or more of the aforementioned monovalent hydrocarbon group and/or the aforementioned monovalent heterocyclic group are bonded via a linking group include a group in which the aforementioned monovalent hydrocarbon group and/or the aforementioned monovalent heterocyclic group is bonded with an alkoxy group, an alkenyloxy group, an alkynyloxy group, an aryloxy group, an aralkyloxy group, an acyloxy group, an alkylthio group, an alkenylthio group, an arylthio group, an aralkylthio group, an acyl group, an alkenylcarbonyl group, an arylcarbonyl group, an aralkylcarbonyl group, an alkoxycarbonyl group, an alkenyloxycarbonyl group, an aryloxycarbonyl group, an aralkyloxycarbonyl group, a dialkylamino group, an acylamino group, an oxetanyl group-containing group, or a carbamoyl group, or, a group in which the aforementioned monovalent hydrocarbon group and/or the aforementioned monovalent heterocyclic group is bonded with two or more of the groups listed above. Furthermore, examples thereof include groups in which the aforementioned monovalent hydrocarbon group, the aforementioned monovalent heterocyclic group, and the aforementioned monovalent hydrocarbon group are bonded in this order (for example, alkyl-oxiranyl-alkyl groups).

The hydrocarbon group of the monovalent organic group may have a substituent. Examples of the substituent include: a halogen atom, such as a fluorine atom, a chlorine atom, a bromine atom, and an iodine atom; a cyano group; an isocyanate group; and an isothiocyanate group.

$R^1$ preferably contains a hydrocarbon group having 4 or more continuous carbon atoms in a straight chain. Examples of such a hydrocarbon group include: a linear alkylene group, such as a tetramethylene group, a pentamethylene group, a hexamethylene group, a heptamethylene group, an octamethylene group, a nonamethylene group, and a decamethylene group; a branched alkylene group, such as a 2-ethylhexamethylene group; a linear alkenylene group, such as a 1-butenylene group, a 2-butenylene group, a 1-pentenylene group, a 2-pentenylene group, and a 3-pentenylene group; a branched alkenylene group, such as a 2-methyl-2-butenylene group; an alicyclic hydrocarbon group having 4 or more carbons, such as a cyclohexyl group; an aromatic hydrocarbon group having 6 or more carbons, such as a phenyl group; and a heterocyclic group containing a structure having 4 or more continuous carbon atoms, such as a piperidine ring.

In Formula (1), a molar ratio of a carbon atom content to a total content of heteroatoms which are selected from the group consisting of nitrogen atoms, oxygen atoms, sulfur atoms, and silicon atoms is 4.5 or greater, preferably 5 or greater, and more preferably 5.5 or greater. When the molar ratio is 4.5 or greater, dispersibility in an organic solvent is excellent. The molar ratio is not particularly limited, but may be, for example, 22 or less, or 20 or less.

In Formula (1), the number of carbon atoms is preferably from 6 to 22, and more preferably from 8 to 20. When the number of carbon atoms is 6 or more, the steric hindrance between the surface-modifying groups is sufficient, and dispersion in the dispersion medium is facilitated. When the number of carbon atoms is 22 or less, the surface-modifying groups is kept from being entangled, and dispersion in the dispersion medium is facilitated.

Among these, the monovalent organic group is preferably a monovalent substituted or unsubstituted hydrocarbon group, a group in which a monovalent substituted or unsubstituted hydrocarbon group and an alkoxy group are bonded, and a group in which a monovalent substituted or unsubstituted hydrocarbon group and a dialkylamino group are bonded.

In particular, in Formula (1), X is preferably —O—, —O—C(=O)—, —C(=O)—O—, or —NH—. When X is —O—, —O—C(=O)—, or —C(=O)—O—, $R^1$ is preferably a monovalent substituted or unsubstituted hydrocarbon group having no hydroxy group, carboxy group, amino group, mono-substituted amino group, terminal alkenyl group, or terminal epoxy group, and more preferably a linear or branched hydrocarbon group having 8 to 20 carbons and having no terminal alkenyl group.

When X is —NH—, $R^1$ is preferably a monovalent organic group containing 8 to 20 carbon atoms and having no hydroxy group, carboxy group, amino group, mono-substituted amino group, terminal alkenyl group, or terminal epoxy group. When X is —NH—, $R^1$ is preferably a monovalent organic group containing a hydrocarbon group having 4 or more continuous carbon atoms in a straight chain and having no hydroxy group, carboxy group, amino group, mono-substituted amino group, terminal alkenyl group, or terminal epoxy group.

Further, the surface-modified nanodiamond according to one alternative embodiment of the present invention includes nanodiamond particles and a group that surface-modifies the nanodiamond particles and is represented by Formula (I). It is noted that, in the present specification, the group represented by Formula (I) may be referred to as "surface-modifying group (X2)". The surface-modified ND may have only one type of surface-modifying groups (X2), or may have two or more types thereof. Also in the present specification, the surface-modifying group (X1) and the surface-modification group (X2) may be collectively referred to as a "surface-modifying group (X)".

[Chem. 1]

(I)

where in Formula (1), $X^1$ represents —NH—, —O—, —O—C(=O)—, —C(=O)—O—, —NH—C(=O)—, —C(=O)—NH—, or —S—, and the bond extending left from $X^1$ is bonded to a nanodiamond particle; $R^A$ represents a divalent organic group, and an atom bonded to $X^1$ is a carbon atom; and $R^B$ represents a monovalent organic group.

In Formula (I), $X^1$ represents —NH—, —O—, —O—C(=O)—, —C(=O)—O—, —NH—C(=O)—, —C(=O)—NH—, or —S—, and is preferably —NH— or —O—. The bond extending left from $X^1$ is bonded to a nanodiamond particle. It is noted that in each of these listed bonds, the bond extending to the left is bonded to a nanodiamond particle and the bond extending to the right is bonded to $R^A$.

In Formula (I), $R^A$ represents a divalent organic group, and an atom bonded to $X^1$ is a carbon atom. Examples of the divalent organic group of $R^A$ include a substituted or unsubstituted hydrocarbon group (a divalent hydrocarbon group), a substituted or unsubstituted heterocyclic group (a divalent heterocyclic group), and a group in which two or more of the aforementioned divalent hydrocarbon group and/or the aforementioned divalent heterocyclic group are bonded. The bonded group may be directly bonded or may be bonded via a linking group. Examples of the linking group include an amino group, an ether bond, an ester bond, a phosphinic acid group, a sulfide bond, a carbonyl group, an organic group-substituted amide group, an organic group-substituted urethane bond, an organic group-substituted imide bond, a thiocarbonyl group, a siloxane bond, and a group in which two or more of those listed above are bonded.

Examples of the hydrocarbon group and the heterocyclic group in the divalent organic group include those exemplified and described as the monovalent organic group in $R^1$ in Formula (1), except for one hydrogen atom.

The hydrocarbon group of the divalent organic group may have a substituent. Examples of the substituent include: a halogen atom, such as a fluorine atom, a chlorine atom, a bromine atom, and an iodine atom; a cyano group; an isocyanate group; an isothiocyanate group; a hydroxy group; a carboxy group; and an amino group.

Among these, from the viewpoint of achieving superior dispersibility in an organic solvent, $R^A$ is preferably a divalent hydrocarbon group, and more preferably a linear or branched hydrocarbon group. Additionally, from the viewpoint of achieving superior dispersibility in an organic solvent, the number of carbons (number of carbon atoms) in $R^A$ is preferably from 6 to 12, and more preferably from 6 to 10. When the number of carbon atoms is within the aforementioned range, epoxidation can easily proceed at the time of preparing a precursor compound corresponding to the group represented by Formula (I).

In Formula (I), $R^B$ represents a monovalent organic group. Examples of the monovalent organic group of $R^B$ include a substituted or unsubstituted hydrocarbon group (a monovalent hydrocarbon group), a substituted or unsubstituted heterocyclic group (a monovalent heterocyclic group), and a group in which two or more of the aforementioned monovalent hydrocarbon group and/or the aforementioned monovalent heterocyclic group are bonded. The bonded group may be directly bonded or may be bonded via a linking group. Examples of the linking group include an amino group, an ether bond, an ester bond, a phosphinic acid group, a sulfide bond, a carbonyl group, an organic group-substituted amide group, an organic group-substituted urethane bond, an organic group-substituted imide bond, a thiocarbonyl group, a siloxane bond, and a group in which two or more of those listed above are bonded.

Examples of the hydrocarbon group and the heterocyclic group in the monovalent organic group include those exemplified and described as the monovalent organic group in $R^1$ in Formula (1).

The hydrocarbon group of the monovalent organic group may have a substituent. Examples of the substituent include: a halogen atom, such as a fluorine atom, a chlorine atom, a bromine atom, and an iodine atom; a cyano group; an isocyanate group; an isothiocyanate group; a hydroxy group; a carboxy group; and an amino group.

Among these, from the viewpoint of achieving superior dispersibility in an organic solvent, $R^B$ is preferably a monovalent hydrocarbon group, and more preferably a linear or branched hydrocarbon group. Additionally, from the viewpoint of achieving superior dispersibility in an organic solvent, the number of carbons (number of carbon atoms) in $R^B$ is preferably from 6 to 12, and more preferably from 6 to 10.

The total number of carbon atoms in $R^A$ and $R^B$ is not particularly limited, but is preferably 10 or greater (for example, from 10 to 24), and more preferably 12 or greater (for example, from 12 to 20). When the total number of carbon atoms is 10 or greater, the steric hindrance between the surface-modifying groups is sufficient, and dispersion in the dispersion medium is facilitated.

From the viewpoint of achieving excellent chemical stability, the groups represented by $R^A$ and/or $R^B$, and in particular, the groups represented by Formula (I), are preferably free of terminal epoxy groups.

The ND particle constituting the surface-modified ND preferably contains a primary particle of the nanodiamond. In addition, a secondary particle in which several to dozens of the primary particles aggregated (agglutinated) may be included. Furthermore, a surface of the surface-modified ND may have one or two or more of other surface functional groups (for example, an amino group, a hydroxy group, and a carboxy group) in addition to the surface-modifying group (X).

A mass ratio of the ND to the surface-modifying group (X) in the surface-modified ND [ND/surface-modifying group (X)] is not particularly limited, but is preferably 0.5 or greater, and more preferably 2.5 or greater. Furthermore, the mass ratio is preferably 15.0 or less, more preferably 10.0 or less, further preferably 7.0 or less, and particularly preferably 5.0 or less. When the mass ratio is 0.5 or greater, properties as a nanodiamond material are less likely to be impaired. When the mass ratio is 15.0 or less (in particular, 7.0 or less), the degree of modification of the surface-modifying group (X) is sufficient, and dispersibility in the organic solvent is superior. The mass ratio can be determined based on the weight loss rate from 200° C. to 450° C. as measured by thermogravimetric analysis, with the weight loss being considered as the mass of the surface-modifying group (X).

The surface-modified ND has excellent dispersibility in the organic solvent, and when the structure of the ND particles is controlled by adjusting X and $R^1$ in the group represented by Formula (1), adjusting $X^1$, $R^A$, and $R^B$ in the group represented by Formula (I), or the like, dispersibility in various organic solvents and affinity for resins are achieved. For this reason, the surface-modified ND can be used in the fields of engineering application, such as polishing agents for CMP, dresser materials, corrosion-resistant electrode plating materials for fuel cells, high-hardness surface coating layer forming materials for cutting tools and the like, and high heat-resistance and high thermal-conductivity materials.

The particle size (D50) of the aforementioned surface-modified ND is, for example, 400 nm or less, preferably 300 nm or less, more preferably 100 nm or less, and even more preferably 50 nm or less. The lower limit of the particle size (D50) of the surface-modified ND is, for example, 5 nm. Furthermore, the particle size (D90) is, for example, 500 nm or less, preferably 400 nm or less, more preferably 150 nm or less. The lower limit of the particle size (D90) of the surface-modified NDs is, for example, 50 nm. A smaller particle size of the surface-modified ND is preferred from the viewpoint of achieving high transparency of the composite material described below. It is noted that the (average) particle size of the surface-modified ND can be measured by a dynamic light scattering method.

The surface-modified ND can be produced by the method of producing surface-modified nanocarbon particles described below.

Method of Producing Surface-Modified Nanocarbon Particles

The method for producing surface-modified nanocarbon particles according to an embodiment of the present invention includes at least a step of subjecting (may be referred to as "reaction step") a nanocarbon particle that has on its surface a hydroxy group or a carboxy group and is in nanodispersed state in water, to a reaction with a compound represented by Formula (2) in the presence of an acid catalyst to obtain surface-modified nanocarbon particles:

$$R^2\text{—}Y\text{—}H \quad (2)$$

where in Formula (2), Y represents —NH—, —O—, —C(=O)—O—, —C(=O)—NH—, or —S—; and $R^2$ represents a monovalent organic group, and an atom bonded to Y is a carbon atom.

(Reaction Step)

In the reaction step, nanocarbon particles that have a hydroxy group and/or a carboxy group on the surface and are in nanodispersed state in water are reacted with the compound represented by Formula (2), and dehydration condensation between the hydroxy group and/or the carboxy group of the nanocarbon particles and the —H of the compound represented by Formula (2) yields surface-modified nanocarbon particles.

The nanocarbon particles described above are not particularly limited, and particles of a known or commonly used nano-order carbon material (nanocarbon material) can be used. Examples of the nanocarbon material of the nanocarbon particles include nanodiamonds, fullerenes, graphene oxide, nanographite, carbon nanotubes, carbon nanofilaments, onion-like carbon, diamond-like carbon, amorphous carbon, carbon black, carbon nanohorns, and carbon nanocoils. Among these, nanodiamond particles (ND particles) are preferable as the nanocarbon particles. A single type of nanocarbon particles may be used, or two or more types may be used.

The above ND particles are not particularly limited, and known or commonly used nanodiamond particles can be used. The ND particles inherently have carboxy groups and hydroxy groups generated in the production process. A single type of the ND particles may be used, or two or more types may be used.

As the ND particles mentioned above, for example, detonation ND (i.e., ND produced by detonation method) and high temperature and high pressure method ND (i.e., ND produced by a high temperature and high pressure method) can be used. Above all, from the viewpoint of superior dispersibility in the dispersion medium, i.e., from the viewpoint of making the particle diameter of the primary particle be in a single-digit nanometer, a detonation ND is preferred.

The detonation ND mentioned above includes air-cooling detonation ND (i.e., ND produced by an air-cooling detonation method) and water-cooling detonation ND (i.e., ND produced by a water-cooling detonation method). Above all, the air-cooling detonation ND is preferred from the viewpoint of obtaining smaller primary particles compared to the case of the water-cooling detonation ND.

Furthermore, the detonation may be performed in an air atmosphere, or may be performed in an inert gas atmosphere, such as a nitrogen atmosphere, an argon atmosphere, or a carbon dioxide atmosphere.

Specific examples of the compound represented by Formula (2) include primary amines, alcohols, carboxylic acids, amide compounds, and thiols. Only one type of compound may be used, or two or more types of compounds may be used.

In Formula (2), Y represents —NH—, —O—, —O—C(=O)—, —NH—C(=O)—, or —S—. Y is selected in view of whether it is reacted with the hydroxy group or the carboxy group in the nanocarbon particles. It is noted that in each of these listed bonds, the bond extending to the left is bonded to $R^2$ and the bond extending to the right is bonded to a hydrogen atom.

In particular, when the nanocarbon particles have a hydroxy group, Y is preferably —NH—, —O—, —C(=O)—O—, —C(=O)—NH—, or —S—. Furthermore, when the nanocarbon particles have a carboxy group, Y is preferably —O—.

In Formula (2), $R^2$ represents a monovalent organic group, and an atom bonded to Y is a carbon atom. Examples of the monovalent organic group of $R^2$ include a substituted or unsubstituted hydrocarbon group (a monovalent hydrocarbon group), a substituted or unsubstituted heterocyclic group (a monovalent heterocyclic group), and a group in which two or more of the aforementioned monovalent hydrocarbon group and/or the aforementioned monovalent heterocyclic group are bonded. The bonded group may be directly bonded or may be bonded via a linking group. Examples of the linking group include an amino group, an ether bond, an ester bond, a phosphinic acid group, a sulfide bond, a carbonyl group, an amide group, a urethane bond, an imide bond, a thiocarbonyl group, a siloxane bond, and a group in which two or more of those listed above are bonded.

Examples of the hydrocarbon group of the monovalent organic group include, for example, an aliphatic hydrocarbon group, an alicyclic hydrocarbon group, an aromatic hydrocarbon group, and a group in which two or more of those listed above are bonded.

Examples of the aliphatic hydrocarbon group include an alkyl group, an alkenyl group, and an alkynyl group. Examples of the alkyl group include a $C_{1-22}$ alkyl group, such as a methyl group, an ethyl group, a propyl group, an isopropyl group, a butyl group, a hexyl group, an octyl group, an isooctyl group, a decyl group, and a dodecyl group (preferably a $C_{2-20}$ alkyl group, and more preferably a $C_{3-18}$ alkyl group). Examples of the alkenyl group include a $C_{2-22}$ alkenyl group, such as a vinyl group, an allyl group, a methallyl group, a 1-propenyl group, an isopropenyl group, a 1-butenyl group, a 2-butenyl group, a 3-butenyl group, a 1-pentenyl group, a 2-pentenyl group, a 3-pentenyl group, a 4-pentenyl group, and a 5-hexenyl group (preferably a $C_{4-20}$ alkenyl group, and more preferably a $C_{8-18}$ alkenyl group). Examples of the alkynyl group include a $C_{2-22}$ alkynyl group, such as an ethynyl group and a propynyl group (preferably a $C_{4-20}$ alkynyl group, and more preferably a $C_{8-18}$ alkynyl group).

Examples of the alicyclic hydrocarbon group include: a $C_{3-12}$ cycloalkyl group, such as a cyclopropyl group, a cyclobutyl group, a cyclopentyl group, a cyclohexyl group, and a cyclododecyl group; a $C_{3-12}$ cycloalkenyl group, such as a cyclohexenyl group; and a $C_{4-15}$ crosslinked cyclic hydrocarbon group, such as a bicycloheptanyl group and a bicycloheptenyl group.

Examples of the aromatic hydrocarbon group include a $C_{6-14}$ aryl group, such as a phenyl group and a naphthyl group (especially, a $C_{6-10}$ aryl group).

Examples of the heterocycle forming the above heterocyclic group include those exemplified and described as the monovalent organic group in $R^1$ in Formula (1).

Examples of the group in which two or more of the aforementioned monovalent hydrocarbon group and/or the aforementioned monovalent heterocyclic group are bonded via a linking group include a group in which the aforementioned monovalent hydrocarbon group and/or the aforementioned monovalent heterocyclic group is bonded with an alkoxy group, an alkenyloxy group, an alkynyloxy group, an aryloxy group, an aralkyloxy group, an acyloxy group, an alkylthio group, an alkenylthio group, an arylthio group, an aralkylthio group, an acyl group, an alkenylcarbonyl group, an arylcarbonyl group, an aralkylcarbonyl group, an alkoxycarbonyl group, an alkenyloxycarbonyl group, an aryloxycarbonyl group, an aralkyloxycarbonyl group, a dialkylamino group, an acylamino group, an oxetanyl group-containing group, a carbamoyl group, or an epoxy group-containing group such as a glycidyloxy group, or a group in which the aforementioned monovalent hydrocarbon group and/or the aforementioned monovalent heterocyclic group is bonded with two or more of the groups listed above. Furthermore, examples thereof include groups in which the aforementioned monovalent hydrocarbon group, the aforementioned monovalent heterocyclic group, and the aforementioned monovalent hydrocarbon group are bonded in this order (for example, alkyl-oxiranyl-alkyl groups).

The hydrocarbon group of the monovalent organic group may have a substituent. Examples of the substituent include: a halogen atom, such as a fluorine atom, a chlorine atom, a bromine atom, and an iodine atom; a cyano group; an isocyanate group; an isothiocyanate group; a hydroxy group; a carboxy group; and an amino group. The monovalent organic group is preferably free of terminal epoxy groups as substituents other than —Y—H. Furthermore, the substituent other than —Y—H may not have a hydroxy group, a carboxy group, an amino group, a mono-substituted amino group, a terminal alkenyl group, and a terminal epoxy group (in particular, a functional group containing active hydrogen).

$R^2$ preferably contains a hydrocarbon group having 4 or more continuous carbon atoms in a straight chain. Examples of such a hydrocarbon group include: a linear alkylene group, such as a tetramethylene group, a pentamethylene group, a hexamethylene group, a heptamethylene group, an octamethylene group, a nonamethylene group, and a decamethylene group; a branched alkylene group, such as a 2-ethylhexamethylene group; a linear alkenylene group, such as a 1-butenylene group, a 2-butenylene group, a 1-pentenylene group, a 2-pentenylene group, and a 3-pentenylene group; a branched alkenylene group, such as a 2-methyl-2-butenylene group; an alicyclic hydrocarbon group having 4 or more carbons, such as a cyclohexyl group; an aromatic hydrocarbon group having 6 or more carbons, such as a phenyl group; and a heterocyclic group containing a structure having 4 or more continuous carbon atoms, such as a piperidine ring.

In Formula (2), a molar ratio of a carbon atom content to a total content of heteroatoms which are selected from the group consisting of nitrogen atoms, oxygen atoms, sulfur atoms, and silicon atoms is preferably 4.5 or greater, more preferably 5 or greater, and even more preferably 5.5 or greater. When the molar ratio is 4.5 or greater, dispersibility of the obtained surface-modified nanocarbon particles in an organic solvent is excellent. The molar ratio may be, for example, 22 or less, or 20 or less.

In Formula (2), the number of carbon atoms is preferably from 6 to 22, and more preferably from 8 to 20. When the number of carbon atoms is 6 or more, the steric hindrance between the surface-modifying groups is sufficient, and dispersion in the dispersion medium is facilitated. When the number of carbon atoms is 22 or less, the surface-modifying groups is kept from being entangled, and dispersion in the dispersion medium is facilitated.

Among these, the monovalent organic group is preferably a monovalent substituted or unsubstituted hydrocarbon group, a group in which a monovalent substituted or unsubstituted hydrocarbon group and an alkoxy group are bonded, and a group in which a monovalent substituted or unsubstituted hydrocarbon group and a dialkylamino group are bonded.

In particular, in Formula (2), Y is preferably —O—, —C(=O)—O—, or —NH—. When Y is —O— or —C(=O)—O—, $R^2$ is preferably a monovalent substituted or unsubstituted hydrocarbon group, and more preferably a linear or branched hydrocarbon group having from 8 to 20 carbons.

When Y is —NH—, $R^2$ is preferably a monovalent organic group containing from 8 to 20 carbon atoms. Furthermore, when Y is —NH—, $R^2$ is preferably a monovalent organic group containing a hydrocarbon group having 4 or more continuous carbon atoms in a straight chain.

$R^2$ is specifically $R^1$ in the group represented by Formula (1) and is preferably a group constituted by a moiety other than $X^1$ in the group represented by Formula (I).

The reaction step is performed while the nanocarbon particles are in a state of being nanodispersed in water, that is, the reaction is performed in an aqueous dispersion composition of the nanocarbon particles. A median diameter (D50) of nanocarbon particles in the aqueous dispersion composition is preferably from 1 to 100 nm, more preferably from 1 to 50 nm, and even more preferably from 1 to 10 nm. When the median diameter is within such a range, the amount of hydroxy groups and/or carboxy groups on the surfaces of the nanocarbon particles is large, and the reaction with the compound represented by Formula (2) proceeds more. In addition, the dispersibility of the obtained surface-modified nanocarbon particles is excellent.

The acid catalyst can be a known or commonly-used acid catalyst used in, for example, esterification of a carboxylic acid and an alcohol, a dehydration condensation reaction of an alcohol and an amine, a dehydration condensation reaction of an alcohol and a thiol. Examples of the acid catalyst include a sulfonic acid group-containing compound, hydrochloric acid, nitric acid, sulfuric acid, sulfur trioxide, phosphoric acid, boric acid, a trihaloacetic acid (such as trichloroacetic acid and trifluoroacetic acid), a salt thereof (such as an ammonium salt), and an inorganic solid acid. Only one of the acid catalyst may be used, or two or more may be used.

The acid catalyst may be in either a form of a homogeneous catalyst that may dissolve in a solvent or substrate during the reaction or in a form of a heterogeneous catalyst that does not dissolve during the reaction. Examples of the heterogeneous catalyst include a supported catalyst in which an acid component is supported on a carrier.

Examples of the sulfonic acid group-containing compound include: an aliphatic sulfonic acid, such as methanesulfonic acid, ethanesulfonic acid, propanesulfonic acid, butanesulfonic acid, dodecanesulfonic acid, hexadecanesulfonic acid, trifluoromethanesulfonic acid, and heptadecafluorooctanesulfonic acid; an alicyclic sulfonic acid, such as 10-camphorsulfonic acid; an aromatic sulfonic acid, such as benzenesulfonic acid, p-toluenesulfonic acid, 2,4,6-trimethylbenzenesulfonic acid, hexylbenzenesulfonic acid, octylbenzenesulfonic acid, decylbenzenesulfonic acid, dodecylbenzenesulfonic acid (DBSA), octadecylbenzenesulfonic acid, 1-naphthalenesulfonic acid, 2-naphthalenesulfonic acid, and butyl-2-naphthalenesulfonic acid; and a sulfonic acid type ion-exchange resin, 3-[trioctylammonio]propane-1-sulfonic acid-triflimide, 4-[trioctylammonio]butane-1-sulfonic acid-triflimide, and a compound represented by Formula (A).

[Chem. 2]

(A)

Examples of the inorganic solid acid include silica, silica-alumina, alumina, zeolites, activated clay, and montmorillonite.

Examples of the ammonium salt as the acid catalyst include a salt of an ammonium ion represented by Formula (B-1), a salt of an ammonium ion represented by Formula (B-2), a salt of an ammonium ion represented by Formula (B-3), and a salt of an ammonium ion represented by Formula (B-4).

[Chem. 3]

(B-1)

(B-2)

(B-3)

(B-4)

In Formula (B-1), $R^I$ to $R^{III}$ all or independently represent a hydrogen atom, an aliphatic hydrocarbon group, or a group containing an aromatic hydrocarbon group. The aliphatic hydrocarbon group is preferably a linear or branched $C_{1-22}$ hydrocarbon group. Examples of the group containing an aromatic hydrocarbon group include: an aromatic hydrocarbon group, such as a phenyl group; and a group in which an aliphatic hydrocarbon group and an aromatic hydrocarbon group are bonded, such as a 4-t-butylphenyl group and a mesityl group. Among these, it is preferable that two or more of $R^I$ to $R^{III}$ are a group containing an aromatic hydrocarbon group.

The acid anion serving as the counter anion to the ammonium ion represented by Formulas (B-1) to (B-3) is preferably a sulfonate ion, more preferably an aromatic sulfonate ion, and particularly preferably a p-dodecylbenzene sulfonate ion.

In Formula (B-4), $R^i$ and $R^{ii}$ all or independently represent a hydrogen atom, an aliphatic hydrocarbon group, or a group containing an aromatic hydrocarbon group. The aliphatic hydrocarbon group is preferably a linear or branched $C_{1-4}$ hydrocarbon group. Examples of the group containing an aromatic hydrocarbon group include an aromatic hydrocarbon group, such as a phenyl group, and a group in which an aliphatic hydrocarbon group and an aromatic hydrocarbon group are bonded. Among these, a hydrogen atom, a methyl group, an isopropyl group, and a phenyl group are preferable.

The acid anion serving as the counter anion to the ammonium ion represented by Formula (B-4) is preferably a sulfonate ion or a sulfate ion, and particularly preferably a trifluoromethanesulfonate ion, a 10-camphorsulfonate ion, a benzenesulfonate ion, or a sulfate ion.

The acid anion serving as the counter anion to the ammonium ion represented by Formulas (B-1) to (B-4) may form a complex salt by forming a hydrogen bond with an oxygen atom forming an acid group and a hydrogen atom on a nitrogen atom in Formulas (B-1) to (B-4). Regarding the complex salt, one ammonium cation and one acid anion may form one salt, or two ammonium cations and two acid anions may form one salt; the number of ammonium cations and the number of acid anions forming one salt is not particularly limited. Furthermore, the acid anion may form a multimer in one salt. For example, a sulfuric acid that forms sulfate ions may form a structure represented by $[H_2SO_4(SO_3)_x]$. Examples of the complex salt formed by an acid anion and the above Formula (B-4) include a compound represented by Formula (C):

[Chem. 4]

(C)

In Formula (C), $R^i$ and $R^{ii}$ are the same as those in Formula (B-4).

Among these, from the viewpoint of further promoting the reaction in the reaction step described above, the acid catalyst is preferably a sulfonic acid group-containing compound or an ammonium salt of a sulfonic acid group-containing compound.

A ratio of the nanocarbon particles to the compound represented by Formula (2) (former:latter, ratio by mass) supplied for the reaction is, for example, from 1:1 to 1:25. In addition, a concentration of the nanocarbon particles in the aqueous dispersion composition is, for example, from 1 to 10 mass %, and a concentration of the compound represented by Formula (2) in the aqueous dispersion composition is, for example, from 1 to 60 mass %.

Reaction conditions for the nanocarbon particles and the compound represented by Formula (2) can be appropriately selected from, for example, a temperature from 0 to 100° C., a reaction time from 1 to 48 hours, and a pressure from 1 to 5 atm.

The production method may include other steps in addition to the reaction step described above. For example, to obtain an aqueous dispersion composition in which the nanocarbon particles are in a state of being nanodispersed in water, disintegration may be performed before the reaction step described above. In addition, when the nanocarbon particles are ND particles, the other steps may include forming (formation) ND particles by a detonation method, acid treatment, and oxidation treatment before the reaction step or the disintegration step described above.

(Formation)

In the formation, an electric detonator is attached to a molded explosive and then placed inside a pressure-resistant detonation vessel, and the vessel is sealed in a state in which carbon dioxide and the explosive to be used coexist inside the vessel. The vessel is, for example, made of iron, and the volume of the vessel is, for example, from 0.5 to 40 m³. A mixture of trinitrotoluene (TNT) and cyclotrimethylenetrinitramine, i.e., hexogen (RDX), can be used as the explosive. The mass ratio (TNT/RDX) of TNT to RDX is, for example, in a range from 40/60 to 70/30.

In the formation, the electric detonator is then triggered to detonate the explosive in the vessel. "Detonation" refers to an explosion, among those associated with a chemical reaction, in which a flame surface where the reaction occurs travels at a high speed exceeding the speed of sound. During the detonation, the explosive that is used undergoes partially incomplete combustion and releases carbon, and the carbon thereof is used as a raw material to produce ND particles through the action of the pressure and energy of the shock waves that are produced in the explosion. Due to Coulomb interaction between crystal planes as well as van der Waals forces between adjacent primary particles or crystallites, the produced ND particles aggregate very firmly to form agglutinates.

In the formation, next, the vessel and its interior are left to stand for approximately 24 hours at room temperature, and are thereby allowed to be cooled. After the cooling, the crude product of ND particles (including the soot and agglutinates of the ND particles formed as described above) adhered to the inner wall of the vessel is scraped off with a spatula, and the crude product of ND particles is thereby collected. A crude product of ND particles (ND particle crude product) can be obtained by the method described above. Furthermore, by implementing the above-described process of forming nanodiamonds several times as necessary, a desired amount of the crude product of ND particles can be obtained.

(Oxidation Treatment)

The oxidation treatment is a process to remove metal oxide and graphite from the ND particle crude product using an oxidizing agent. The ND particle crude product obtained by the detonation method includes graphite, and this graphite is derived from carbon that did not form ND particle crystals, the carbon thereof being from among the carbon released by partially incomplete combustion of the explosive that is used. The graphite can be removed from the ND particle crude product by allowing an oxidizing agent to act thereon in an aqueous solvent. Furthermore, by allowing the oxidizing agent to act thereon, an oxygen-containing group, such as a carboxy group or a hydroxy group, can be introduced onto the surface of a ND particle.

Examples of the oxidizing agent used in the oxidation treatment include chromic acid, chromic anhydride, dichromic acid, permanganic acid, perchloric acid, nitric acid, and mixtures thereof, a mixed acid of at least one acid selected therefrom and another acid (for example, sulfuric acid), and salts thereof. Among these, a mixed acid (in particular, a mixed acid of sulfuric acid and nitric acid) is preferably used since such a mixed acid is environmentally friendly and exhibits excellent performance in oxidizing and removing graphite.

The mixing ratio of sulfuric acid to nitric acid (the former/the latter, mass ratio) in the above-described mixed acid is preferably, for example, from 60/40 to 95/5 because when the mixing ratio is in that range, the graphite can be efficiently oxidizes and removed at, for example, a temperature of 130° C. or higher (particularly preferably 150° C. or higher, and the upper limit being 200° C., for example), even under a pressure near normal pressure (for example, from 0.5 to 2 atm). The lower limit of the mixing ratio is preferably 65/35, and more preferably 70/30. The upper limit of the mixing ratio is preferably 90/10, more preferably 85/15, and still more preferably 80/20. When the mixing ratio is not less than 60/40, the content of sulfuric acid having a high boiling point is high, and therefore the reaction temperature becomes, for example, 120° C. or higher under a pressure near that of normal pressure, and therefore, the efficiency in graphite removal tends to be improved. When the mixing ratio is less than or equal to 95/5, nitric acid that greatly contributes to oxidation of graphite is contained in a larger amount, and thus efficiency in graphite removal tends to be improved.

The usage amount of the oxidizing agent (in particular, the mixed acid) is, for example, from 10 to 50 parts by mass, preferably from 15 to 40 parts by mass, and particularly preferably from 20 to 40 parts by mass, per 1 part by mass of the ND particle crude product. In addition, the usage amount of sulfuric acid in the mixed acid is, for example, from 5 to 48 parts by mass, preferably from 10 to 35 parts by mass, and more preferably from 15 to 30 parts by mass, per 1 part by mass of the ND particle crude product. In addition, the usage amount of nitric acid in the mixed acid is, for example, from 2 to 20 parts by mass, preferably from 4 to 10 parts by mass, and more preferably from 5 to 8 parts by mass, per 1 part by mass of the ND particle crude product.

Furthermore, when the mixed acid is used as the oxidizing agent, a catalyst may be used together with the mixed acid. When the catalyst is used, the removal efficiency of graphite can be further improved. Examples of the catalyst include copper (II) carbonate. The usage amount of the catalyst is, for example, approximately from 0.01 to 10 parts by mass per 100 parts by mass of the ND particle crude product.

The oxidation treatment temperature is, for example, from 100 to 200° C. The duration of the oxidation treatment is, for example, from 1 to 24 hours. The oxidation treatment can be performed under reduced pressure, at atmospheric pressure, or under pressurization.

After the oxidation treatment described above, the supernatant is preferably removed by decantation, for example. In addition, in decantation, the solid content is preferably washed with water. The supernatant liquid from the initial washing with water is colored, and thus, the solid content is preferably repeatedly washed with water until the supernatant liquid becomes visually transparent. Furthermore, the obtained solid content is dried, and heat treatment is preferably performed in the presence of a gas of approximately 5 to 20 volume % oxygen and approximately 80 to 95 volume % nitrogen. The gas is preferably continuously supplied, and has a gas flow rate from, for example, 5 to 30 L/min. Heating conditions include, for example, a temperature from 300° C. to 500° C. and a time from 1 to 10 hours. The heating can be performed using a rotary kiln. By performing the heat treatment following the oxidation treatment, an oxygen atom-containing functional group (hydroxy group, carboxy group, etc.) introduced onto the surface of the nanocarbon particles such as ND particles by the oxidation treatment can be increased.

Disintegration

In the disintegration, the nanocarbon particles such as ND particles are subjected to disintegration treatment. The disintegrating treatment can be performed using, for example, a high shearing mixer, a high shear mixer, a homomixer, a ball mill, a bead mill, a high pressure homogenizer, an ultrasonic homogenizer, or a colloid mill. The disintegration treatment may be performed by a wet process (for example, disintegration treatment in a state of being suspended in water or the like) or may be performed by a dry process, but from the viewpoint of allowing the aforementioned reaction step to be performed in the aqueous dispersion composition as is, thereby achieving excellent ease of production, the disintegration treatment is preferably performed by a wet process using water. When the disintegration treatment is performed by a dry process, drying is preferably performed before the disintegration treatment. When the disintegration treatment is performed by a wet process using water, pH adjustment is performed to become basic after the heat treatment, and thus dispersibility in water can be improved.

Furthermore, the disintegration may be, in the case of performing the oxidation treatment or the hydrogenation treatment, performed after the treatment. From the viewpoint of minimizing contamination of the bead mill such as zirconia beads, the processing time for performing disintegration treatment using a bead mill is preferably from 1 to 8 hours.

According to the production method described above, since there is no need to use powder of nanocarbon particles, after disintegration by bead mill treatment or the like to obtain an aqueous dispersion, it is not necessary to obtain powder of nanodiamond particles by drying or desolventizing, and thus surface-modified nanocarbon particles can be easily produced. Furthermore, since disintegration and reaction are not simultaneously performed by bead mill treatment, and the nanocarbon particles in a state of being dispersed in water are reacted with a reactant, various surface-modifying groups can be introduced without limitation of a surface-modifying group that can be introduced as compared to known methods. Further, by not simultaneously performing disintegration and reaction by bead mill treatment, the disintegration treatment time can be minimized, and therefore, contamination of zirconia is small, and a side reaction due to generation of radicals can be suppressed.

Nanocarbon Particle Dispersion Composition

The aforementioned surface-modified ND or the surface-modified nanocarbon particles obtained by the production method described above are dispersed in a dispersion medium to thereby obtain a nanocarbon particle dispersion composition containing the dispersion medium and the surface-modified nanocarbon particles dispersed in the dispersion medium. It is noted that, in a case where ND agglutinates remain after completion of the reaction, a liquid formed after the completion of the reaction is left to stand, the supernatant liquid is thereafter collected and may be used as a nanocarbon particle dispersion composition. Furthermore, after the aqueous dispersion composition obtained by the production method described above is obtained, before or after the water in the dispersion composition is distilled off by an evaporator or the like, a new dispersion medium is mixed and stirred, that is, the nanocarbon particle dispersion composition can be produced by exchanging the solvent.

It is noted that the surface-modified nanocarbon particles obtained by the production method described above and the surface-modified ND having the surface-modifying group (X) described above may be collectively referred to as "surface-modified nanocarbon particles (Y)".

When the nanocarbon particle dispersion composition is obtained by exchanging the solvent, it is preferable that a new dispersion medium is added, the added mixture is washed with water and/or saline, and thereafter, water is removed by extraction and/or distillation.

The dispersion medium is a medium for dispersing the surface-modified nanocarbon particles, and examples of the dispersion medium include water, organic solvents, and ionic liquids. Among these, from the viewpoint of being excellent in dispersibility of the surface-modified nanocarbon particles (Y) in an organic solvent, the dispersion medium is preferably an organic solvent. Only one type of dispersion medium may be used, or two or more types of dispersion media may be used.

Examples of the organic solvent mentioned above include aliphatic hydrocarbon atoms, such as hexane, heptane, and octane (especially, straight-chain saturated aliphatic hydrocarbon atoms); aromatic hydrocarbon atoms, such as benzene, toluene, and xylene; alicyclic hydrocarbon atoms, such as cyclohexane and methylcyclohexane; aprotic polar solvents, such as dimethylformamide (DMF), dimethylacetamide, N-methylpyrrolidone, and dimethyl sulfoxide; alcohols, such as methanol; halogenated hydrocarbon atoms, such as chloroform, dichloromethane, dichloroethane, carbon tetrachloride, chlorobenzene, and trifluoromethylbenzene; linear or cyclic ethers, such as diethyl ether, diisopropyl ether, dimethoxyethane, tetrahydrofuran (THF), and dioxane; esters, such as ethyl acetate and butyl acetate; linear ketones, such as methyl ethyl ketone (MEK) and methyl isobutyl ketone; and nitriles such as acetonitrile. Among these solvents, cyclic ethers or linear ketones are preferred from the viewpoint of being particularly excellent in dispersibility of the surface-modified nanocarbon particles (Y), and linear ketones are particularly preferred.

The rate of content of the nanocarbon particles in the nanocarbon particle dispersion composition is not particularly limited, but is, for example, from 0.1 ppm by mass to 10 mass %.

The rate of content of the nanocarbon particles can be calculated from the absorbance at 350 nm. It is noted that in a case where the rate of content of the surface-modified nanocarbon particles is a low concentration (for example, less than or equal to 2000 ppm by mass), a compound in which the nanocarbon particles are surface-modified by high-frequency inductively-coupled plasma emission spectroscopy (ICP emission spectroscopy) can be detected, and the rate of content can be determined on the basis of the detected amount.

The content of the dispersion medium in the nanocarbon particle dispersion composition is, for example, from 90 to 99.9999 mass %. It is to be noted that the upper limit is 100 mass %.

The nanocarbon particle dispersion composition may include only the surface-modified nanocarbon particles (Y) and the dispersion medium, or may contain other components. Examples of other components include surfactants, thickeners, coupling agents, dispersants, rust inhibitors, corrosion inhibitors, freezing point depressants, anti-foaming agents, anti-wear additives, antiseptics, and colorants. The rate of content of the other components to the total amount of the nanocarbon particle dispersion composition is, for example, 30 mass % or less, preferably 20 mass % or less, more preferably 10 mass % or less, even more preferably 5 mass % or less, and particularly preferably 1 mass % or less. Accordingly, the rate of total content of the surface-modified nanocarbon particles (Y) and the dispersion medium to the total amount of the nanocarbon particle dispersion composition is, for example, 70 mass % or more, preferably 80 mass % or more, more preferably 90 mass % or more, even more preferably 95 mass % or more, and particularly preferably 99 mass % or more.

The nanocarbon particle dispersion composition contains the surface-modified nanocarbon particles (Y) in a highly dispersed state. The average particle size (D50) of the nanocarbon particles in the nanocarbon particle dispersion composition is, for example, 100 nm or less, preferably 60 nm or less, more preferably 50 nm or less, and even more preferably 20 nm or less. The lower limit of the average dispersed particle size of the nanocarbon particles is, for example, 5 nm.

The nanocarbon particle dispersion composition has a haze value of preferably 5 or less, more preferably 3 or less, and even more preferably 1 or less. The nanocarbon particle dispersion composition is excellent in dispersibility of the surface-modified nanocarbon particles (Y), and thus a nanocarbon particle dispersion composition having the haze value mentioned above can be obtained. The haze value can be measured according to JIS K 7136.

The nanocarbon particle dispersion composition can be preferably used, for example, as an additive to composite materials for imparting the characteristics of fine nanocarbon particles (such as, for example, mechanical strength, high refractive index, thermal conductivity, insulating properties, antioxidation properties, crystallization promoting action, and dendrite suppressing action) to a resin or the like (such as, for example, photocurable resins and thermoplastic resins). In addition, a composition obtained by adding the nanocarbon particle dispersion composition to a resin can be preferably used as, for example, a functional hybrid material, a thermally functional material (such as heat resistant, heat storing, thermo-electrically conductive, and heat insulating), a photonic material (such as an organic EL element, an LED, a liquid crystal display, and an optical disk), a bio/biocompatible material, such as a thermal barrier film) material, a sheet material, a screen material (such as a transmission type transparent screen), a filler material (such as a filler for heat radiation or for improving a mechanical property), a heat resistant plastic substrate material (such as a substrate for a flexible display), and a material for a lithium ion battery. Furthermore, the nanocarbon particle dispersion composition can be used for medical applications as well.

Each aspect disclosed in the present specification can be combined with any other feature disclosed herein. The configurations, combinations thereof, and the like in each embodiment of the present invention are examples, and various configurational additions, omissions, substitutions, and other changes may be made as appropriate without departing from the spirit of the present invention. Furthermore, inventions according to the present invention are not limited by the embodiments or the following examples, but are limited only by the claims.

EXAMPLES

An embodiment of the present invention will be described in further detail below based on examples.

Example 1

Surface-modified ND particles and a dispersion composition were produced through the following processes.
(Production of Surface-Modified ND Particles)
First, the formation of ND by a detonation method was performed. In the present formation, at first, a molded explosive attached with an electric detonator was placed inside a pressure-resistant vessel for detonation, and the vessel was sealed. The vessel was made of iron and had a capacity of 15 m$^3$. As the explosive, 0.50 kg of a mixture of TNT and RDX was used. The mass ratio of the TNT and RDX (TNT/RDX) in the explosive was 50/50. The electric detonator was then triggered to detonate the explosive in the vessel (formation of ND by detonation method). Subsequently, the container and its interior were left standing for 24 hours at room temperature, and were thereby cooled. After this cooling, the ND crude product was recovered by scraping with a spatula the ND crude product (including soot and aggregates of the ND particles produced by the detonation method described above) deposited on the inner wall of the container.

An oxidation treatment was then performed. The ND crude product formed by performing the formation described above multiple times was subjected to oxidation treatment. Specifically, 6 L of 98 mass % sulfuric acid and 1 L of 69 mass % nitric acid were added to the ND crude product to form a slurry, and then the slurry was subjected to heat treatment under reflux at normal pressure conditions for 48 hours. The heating temperature in this oxidation treatment was from 140 to 160° C. Next, after cooling, the solid (containing the ND agglutinates) was washed with water by decantation. The initial supernatant liquid from the water washing was colored, and therefore washing of the solid content with water by decantation was repeated until the supernatant liquid became visually clear. Thereafter, the solid content was dried to obtain the ND agglutinates as a powder. Furthermore, the powder was heated in a rotary kiln, into which a gas of approximately 8 volume % oxygen and approximately 92 volume % nitrogen was blown at a flow rate of 20 L/min, for 6 hours at 400° C.

Next, the pH of approximately 30 ml of the slurry containing the ND agglutinates obtained through the oxidation treatment described above was adjusted to 10 using ammonia water. Thereafter, bead milling was performed using a bead milling apparatus (trade name "Parallel 4-Tube Sand Grinder Model LSG-4U-2L", available from Aimex Co., Ltd.). Specifically, 30 ml of the slurry after the ultrasonic irradiation and zirconia beads with a diameter of 30 μm were charged in a 100-ml vessel (available from Aimex Co., Ltd.), which was the mill vessel, and the vessel was sealed. Then, the apparatus was operated to perform bead milling. In this bead milling, the amount of zirconia beads that were charged was, for example, 33 volume % of the capacity of the mill vessel, the rotational speed of the mill vessel was 2570 rpm, and the duration of the milling was 3 hours.

Next, the slurry having undergone the disintegration step as described above was subjected to centrifugation treatment (classification operation) using a centrifuge. The centrifugal force in this centrifugation treatment was 20000× g, and the duration of the centrifugation was 30 minutes. Next, 10 ml of supernatant of the ND-containing solution that had been subjected to this centrifugation treatment was collected. In this manner, an ND aqueous dispersion in which nanodiamond was dispersed in pure water was obtained. This ND aqueous dispersion had a solid content concentration of 6.0 mass % and a pH of 9.0. The median diameter (particle size D50) of the ND aqueous dispersion obtained as described above was 6.0 nm.

Next, the ND aqueous dispersion obtained through the disintegration described above was diluted by adding water to have a solid content concentration of approximately 6 mass %, 0.5 mmol of dodecylbenzenesulfonic acid as an acid catalyst and 2 mmol of n-octadecanol were added to 1 g of the ND aqueous dispersion, and the mixture was reacted for 8 hours at 80° C. while being stirred. After completion of the reaction, 10 mL of toluene was added, and the mixture was cooled to room temperature. Thereafter, washing with water and saturated saline solution was performed to obtain a toluene dispersion composition of ND particles modified by an n-octadecanoxy group. The median diameter (particle size D50) of the obtained surface-modified ND particles was approximately 18 nm, and the mass ratio [ND/surface-modifying group] determined by thermogravimetric analysis was 14.6.

Example 2

A toluene dispersion composition of ND particles modified by an n-decaneoxy group was obtained by performing the reaction in the same manner as in Example 1 with the exception that 2 mmol of n-decanol was used instead of 2 mmol of n-octadecanol. The median diameter (particle size D50) of the obtained surface-modified ND particles was approximately 24 nm, and the mass ratio [ND/surface-modifying group] determined by thermogravimetric analysis was 10.1.

Example 3

A toluene dispersion composition of ND particles modified by an n-octylamino group was obtained by performing the reaction in the same manner as in Example 1 with the exception that 2 mmol of n-octylamine was used instead of 2 mmol of n-octadecanol. The median diameter (particle size D50) of the obtained surface-modified ND particles was approximately 14 nm, and the mass ratio [ND/surface-modifying group] determined by thermogravimetric analysis was 3.4.

Example 4

A toluene dispersion composition of ND particles modified by an n-octadecylamino group was obtained by performing the reaction in the same manner as in Example 1 with the exception that 2 mmol of n-octadecylamine was used instead of 2 mmol of n-octadecanol. The median diameter (particle size D50) of the obtained surface-modified ND particles was approximately 20 nm, and the mass ratio [ND/surface-modifying group] determined by thermogravimetric analysis was 5.7.

Example 5

A toluene dispersion composition of ND particles modified by a 9-octadecenylamino group was obtained by performing the reaction in the same manner as in Example 1 with the exception that 2 mmol of 9-octadecenylamine was used instead of 2 mmol of n-octadecanol. The median diameter (particle size D50) of the obtained surface-modified ND particles was approximately 18 nm, and the mass ratio [ND/surface-modifying group] determined by thermogravimetric analysis was 2.9.

Example 6

A toluene dispersion composition of ND particles modified by a 2-cyclohexylethylamino group was obtained by performing the reaction in the same manner as in Example 1 with the exception that 2 mmol of 2-cyclohexylethylamine was used instead of 2 mmol of n-octadecanol. The median diameter (particle size D50) of the obtained surface-modified ND particles was approximately 20 nm, and the mass ratio [ND/surface-modifying group] determined by thermogravimetric analysis was 5.6.

Example 7

A toluene dispersion composition of ND particles modified by a 3-(2-ethylhexyloxy)propylamino group was obtained by performing the reaction in the same manner as in Example 1 with the exception that 2 mmol of 3-(2-ethylhexyloxy)propylamine was used instead of 2 mmol of n-octadecanol. The median diameter (particle size D50) of the obtained surface-modified ND particles was approximately 24 nm, and the mass ratio [ND/surface-modifying group] determined by thermogravimetric analysis was 5.6.

Example 8

A toluene dispersion composition of ND particles modified by a 3-(N,N-di-n-butylamino)propylamino group was obtained by performing the reaction in the same manner as in Example 1 with the exception that 2 mmol of 3-(N,N-di-n-butylamino)propylamine was used instead of 2 mmol of n-octadecanol. The median diameter (particle size D50) of the obtained surface-modified ND particles was approximately 25 nm, and the mass ratio [ND/surface-modifying group] determined by thermogravimetric analysis was 6.4.

Example 9

A toluene dispersion composition of ND particles modified by a 3-phenylpropylamino group was obtained by performing the reaction in the same manner as in Example 1 with the exception that 2 mmol of 3-phenylpropylamine was used instead of 2 mmol of n-octadecanol. The median diameter (particle size D50) of the obtained surface-modified ND particles was approximately 22 nm, and the mass ratio [ND/surface-modifying group] determined by thermogravimetric analysis was 8.6.

Example 10

A toluene dispersion composition of ND particles modified by an acyloxy group derived from stearic acid was obtained by performing the reaction in the same manner as in Example 1 with the exception that 2 mmol of stearic acid was used instead of 2 mmol of n-octadecanol. The median diameter (particle size D50) of the obtained surface-modified ND particles was approximately 18 nm, and the mass ratio [ND/surface-modifying group] determined by thermogravimetric analysis was 10.3.

Example 11

A toluene dispersion composition of ND particles modified by an acyloxy group derived from undecanoic acid was obtained by performing the reaction in the same manner as in Example 1 with the exception that 2 mmol of undecanoic acid was used instead of 2 mmol of n-octadecanol. The median diameter (particle size D50) of the obtained surface-modified ND particles was approximately 27 nm, and the mass ratio [ND/surface-modifying group] determined by thermogravimetric analysis was 6.3.

Example 12

A toluene dispersion composition of ND particles modified by an n-octadecanoxy group was obtained by performing the reaction in the same manner as in Example 1 with the exception that 0.5 mmol of 4-[trioctylammonio]butane-1-sulfonic acid-triflimide (HBAIL) was used as the acid catalyst. The median diameter (particle size D50) of the obtained surface-modified ND particles was approximately 22 nm, and the mass ratio [ND/surface-modifying group] determined by thermogravimetric analysis was 4.2.

Example 13

A toluene dispersion composition of ND particles modified by an n-octadecylamino group was obtained by performing the reaction in the same manner as in Example 4 with the exception that 0.5 mmol of 4-[trioctylammonio]butane-1-sulfonic acid-triflimide (HBAIL) was used as the acid catalyst. The median diameter (particle size D50) of the obtained surface-modified ND particles was approximately 24 nm, and the mass ratio [ND/surface-modifying group] determined by thermogravimetric analysis was 6.8.

Example 14

A toluene dispersion composition of ND particles modified by an acyloxy group derived from stearic acid was obtained by performing the reaction in the same manner as in Example 10 with the exception that 0.5 mmol of 4-[trioctylammonio]butane-1-sulfonic acid-triflimide (HBAIL) was used as the acid catalyst. The median diameter (particle size D50) of the obtained surface-modified ND particles was approximately 24 nm, and the mass ratio [ND/surface-modifying group] determined by thermogravimetric analysis was 4.5.

Example 15

Next, to 500 mg of the ND aqueous dispersion (solid content concentration: approximately 6 mass %) obtained through the disintegration in Example 1, 82 mg (0.25 mmol) of dodecylbenzenesulfonic acid as an acid catalyst, 2 mL of water, and 213 mg (0.75 mmol) of 3-octyl-2-oxiraneoctanamine were sequentially added, and the mixture was reacted for 8 hours at 80° C. while being stirred. After completion of the reaction, 2 mL of toluene was added, and the mixture was cooled to room temperature. Thereafter, washing with water and saturated saline solution was performed to obtain a toluene dispersion composition of ND particles modified by a 3-octyl-2-oxiraneoctanamino group. The median diameter (particle size D50) of the surface-modified ND particles in the obtained toluene dispersion composition was approximately 22 nm. In addition, toluene was removed from the toluene dispersion composition, and THF or MIBK was added to the obtained solid to produce a THF dispersion composition and an MIBK dispersion composition. The surface-modified ND particles were dispersed in the THF dispersion composition and the MIBK dispersion composition.

Example 16

A toluene dispersion composition of ND particles modified by a 3-octyl 2-oxiraneoctanoxy group was obtained in the same manner as in Example 15 with the exception that 0.75 mmol of 3-octyl 2-oxiraneoctanol was used instead of 0.75 mmol of 3-octyl-2-oxiraneoctanamine. In addition, toluene was removed from the toluene dispersion composition, and THF was added to the obtained solid to produce a THF dispersion composition. The surface-modified ND particles were dispersed in the toluene dispersion composition and the THF dispersion composition.

<Particle Size D50>

The median diameters (particle sizes D50) of the ND particles in the ND dispersion compositions obtained in the manners described above were volume-based values measured from the nanodiamond particle size distributions obtained by a dynamic light scattering method. Specifically, the nanodiamond particle size distributions were measured by a dynamic light scattering method (non-contact backscattering method) with the use of an instrument (trade name "Zetasizer Nano ZS") available from Malvern Panalytical Ltd.

<Thermogravimetric Analysis>

Using a TG/DTA (thermogravimetric and differential-thermal analysis) device (trade name "EXSTAR6300", available from SII NanoTechnology Inc.), a sample (approximately 3 mg) was heated at a heating rate of 20° C./minute under an air atmosphere to measure weight loss. Alumina was used as the reference material.

<FT-IR Analysis>

The surface-modified nanodiamonds obtained in Examples 1, 4, and 10 were subjected to FT-IR measurement using a Fourier transform infrared spectrophotometer "IRTracer" (available from Shimadzu Corporation) equipped with a heating vacuum stirring reflex "Heat Chamber Type-1000° C." (available from ST Japan Inc.). It is noted that to remove adsorbed water of the ND particles, heating was performed at 150° C. for 10 minutes under a vacuum of $2 \times 10^{-3}$ Pa, and then the FT-IR measurement was performed.

Figure 1:
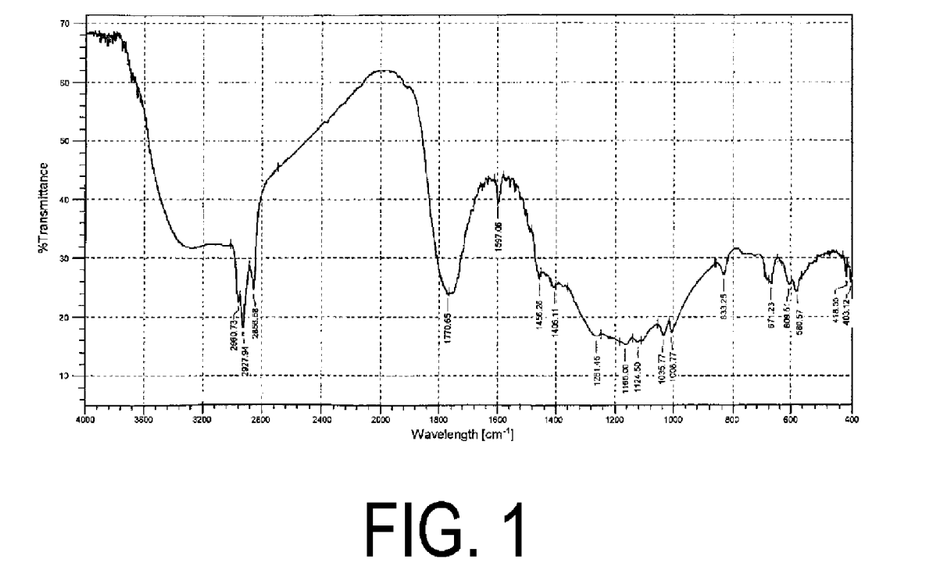
FIG. 1 is a figure showing an FT-IR spectrum of a surface-modified nanodiamond produced in Example 1.
Figure 2:
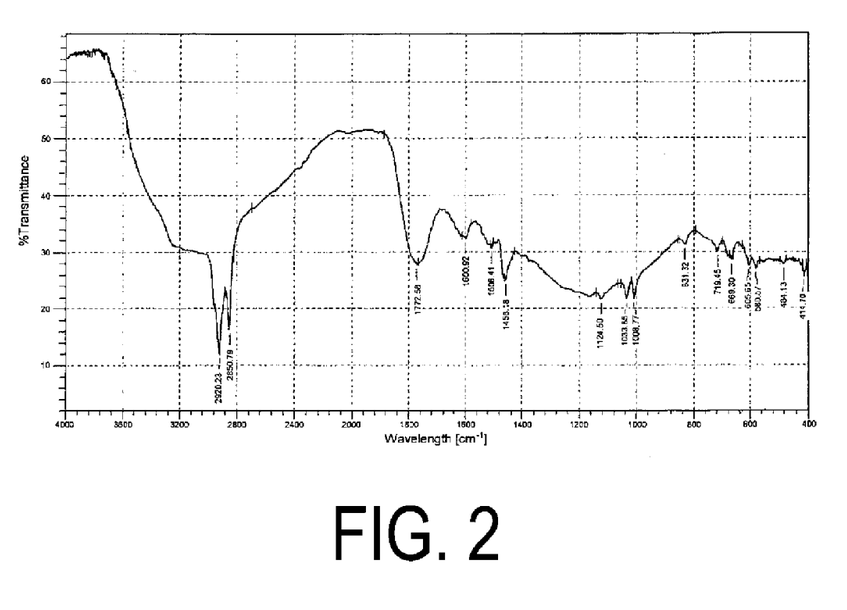
FIG. 2 is a figure showing an FT-IR spectrum of a surface-modified nanodiamond produced in Example 4.
Figure 3:
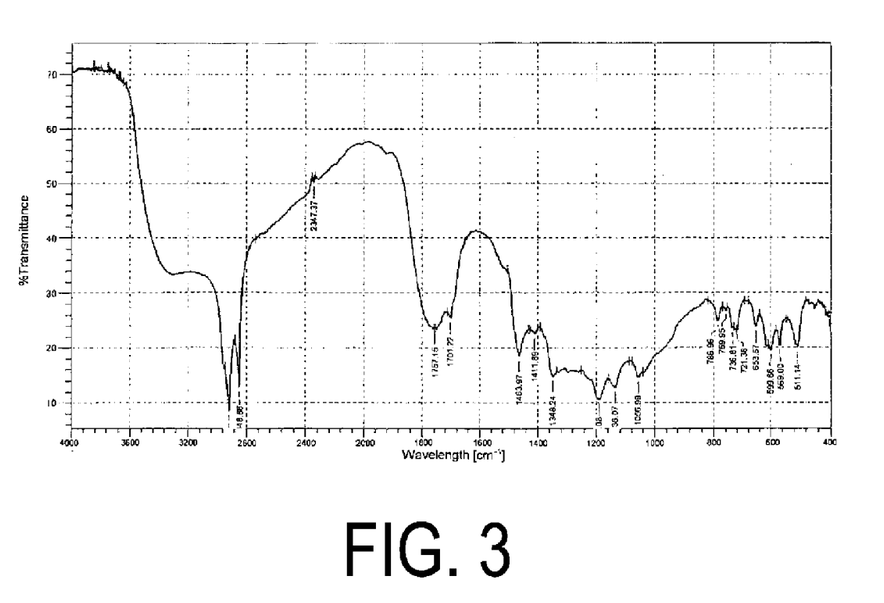
FIG. 3 is a figure showing an FT-IR spectrum of a surface-modified nanodiamond produced in Example 10.

The FT-IR spectra of the surface-modified nanodiamond obtained in Examples 1, 4, and 10 are shown in FIGS. 1, 2, and 3, respectively. In Example 1, peaks derived from octadecyl groups were confirmed near 2961 $cm^{-1}$, near 2928 $cm^{-1}$, and near 2857 $cm^{-1}$, and a peak derived from an ether bond was confirmed near 1261 $cm^{-1}$. In Example 4, peaks derived from octadecyl groups were confirmed near 2920 $cm^{-1}$ and near 2851 $cm^{-1}$, and peaks derived from amino groups were confirmed near 3253 $cm^{-1}$ and near 1506 $cm^{-1}$. In Example 10, peaks derived from stearyl groups were confirmed near 2928 $cm^{-1}$ and near 2849 $cm^{-1}$, and a peak derived from an ester bond was confirmed near 1757 $cm^{-1}$.

The invention claimed is:

1. A surface-modified nanodiamond comprising a nanodiamond particle and a group that surface-modifies the nanodiamond particle, the group being represented by Formula (I) and free of terminal epoxy groups:

[Chem. 1]

(I)

wherein in Formula (I), $X^1$ represents —NH—, —O—, —O—C(=O)—, —C(=O)—O—, —NH—C(=O)—, —C(=O)—NH—, or —S—, and a bond extending left from $X^1$ is bonded to a nanodiamond particle; $R^A$ represents a divalent organic group, and an atom bonded to $X^1$ is a carbon atom; and $R^B$ represents a monovalent organic group.

2. The surface-modified nanodiamond according to claim 1, wherein in Formula (I), $R^A$ is a divalent linear or branched hydrocarbon group containing from 6 to 12 carbons.

3. The surface-modified nanodiamond according to claim 1, wherein in Formula (I), $R^B$ is a monovalent linear or branched hydrocarbon group containing from 6 to 12 carbons.

4. The surface-modified nanodiamond according to claim 1, wherein in Formula (I), $X^1$ represents —NH— or —O—.

5. The surface-modified nanodiamond according to claim 1, which, in a nanodispersed state in water, has a median diameter from 1 to 100 nm.

6. The surface-modified nanodiamond according to claim 1, wherein a mass ratio of the ND to the surface-modifying group (X in the surface-modified ND [ND/surface-modifying group (X)] is 0.5 or greater.

7. The surface-modified nanodiamond according to claim 6, wherein the mass ratio of the ND to the surface-modifying group (X) in the surface-modified ND [ND/surface-modifying group (X)] is 15.0 or less.

8. The surface-modified nanodiamond according to claim 7, wherein the mass ratio of the ND to the surface-modifying group (X) in the surface-modified ND [ND/surface-modifying group (X)] is 5.0 or less.

9. The surface-modified nanodiamond according to claim 6, wherein the mass ratio of the ND to the surface-modifying group (X) in the surface-modified ND [ND/surface-modifying group (X)] is 7.0 or less.

10. The surface-modified nanodiamond according to claim 1, wherein a mass ratio of the ND to the surface-modifying group (X) in the surface-modified ND [ND/surface-modifying group (X)] 2.5 or greater.

11. The surface-modified nanodiamond according to claim 10, wherein the mass ratio of the ND to the surface-modifying group (X) in the surface-modified ND [ND/surface-modifying group (X)] is 10.0 or less.

12. The surface-modified nanodiamond according to claim 1, wherein in Formula (I), $R^A$ is a divalent linear or branched hydrocarbon group containing from 6 to 12 carbons, $R^B$ is a monovalent linear or branched hydrocarbon group containing from 6 to 12 carbons, and $X^1$ represents —NH— or —O—.

13. The surface-modified nanodiamond according to claim 12, wherein in Formula (I), $R^A$ is a divalent linear or branched hydrocarbon group containing from 6 to 10 carbons, and $R^B$ is a monovalent linear or branched hydrocarbon group containing from 6 to 10 carbons.

* * * * *